United States Patent [19]
Farber et al.

[11] Patent Number: 5,969,837
[45] Date of Patent: Oct. 19, 1999

[54] COMMUNICATIONS SYSTEM

[75] Inventors: Allan Farber, Hashmonaim; Dmitri Petrov, Beit Shemesh; Howard Loboda, Jerusalem, all of Israel

[73] Assignee: Foxcom Wireless Ltd., Jerusalem, Israel

[21] Appl. No.: 08/886,695

[22] Filed: Jul. 1, 1997

[30] Foreign Application Priority Data

Dec. 15, 1996 [IL] Israel ......................................... 119832

[51] Int. Cl.[6] .............................. H04J 14/02; H04B 10/12
[52] U.S. Cl. ......................... 359/132; 359/113; 359/145; 359/172; 359/173; 455/33.1; 379/59
[58] Field of Search ............................ 370/69.1, 18, 95.3; 359/152, 172, 173, 124, 125, 145, 132, 113; 379/58, 59, 60; 455/56.1, 33.1, 33.2

[56] References Cited

U.S. PATENT DOCUMENTS

| | | | |
|---|---|---|---|
| 4,941,207 | 7/1990 | Maeda et al. | 359/172 |
| 5,067,173 | 11/1991 | Gordon et al. | 359/152 |
| 5,125,100 | 6/1992 | Katznelson | 455/63 |
| 5,237,639 | 8/1993 | Kato et al. | 385/131 |
| 5,280,472 | 1/1994 | Gilhousen et al. | 455/279.1 |
| 5,359,447 | 10/1994 | Hahn et al. | 359/154 |
| 5,400,419 | 3/1995 | Heinen | 385/14 |
| 5,424,864 | 6/1995 | Emura | 359/173 |
| 5,448,581 | 9/1995 | Wu et al. | 372/45 |
| 5,457,357 | 10/1995 | Fujii et al. | 313/506 |
| 5,493,577 | 2/1996 | Choquette et al. | 372/46 |
| 5,519,691 | 5/1996 | Darcie et al. | 370/18 |
| 5,642,405 | 6/1997 | Fischer et al. | 379/60 |
| 5,644,622 | 7/1997 | Russell et al. | 455/422 |
| 5,657,374 | 8/1997 | Russell et al. | 370/328 |
| 5,682,379 | 10/1997 | Mahany et al. | 370/311 |
| 5,694,232 | 12/1997 | Parsay et al. | 359/113 |
| 5,696,862 | 12/1997 | Hauer et al. | 385/88 |
| 5,702,305 | 12/1997 | Norman et al. | 463/42 |

*Primary Examiner*—Leslie Pascal
*Attorney, Agent, or Firm*—Darby & Darby

[57] ABSTRACT

This invention discloses a wireless communications station including a base unit including a communications interface for communicating with plural wireless communications networks, a received communications combiner for combining received communications signals received from the plural wireless communications networks into a single radio frequency output, a transmit communications splitter for splitting previously combined transmit communications signals to be transmitted to the plural wireless communications networks into plural radio frequency outputs, at least one fiberoptic transmitter receiving the single radio frequency output and providing a corresponding optical output, and at least one fiberoptic receiver receiving an optical input and providing an RF output containing previously combined transmit communications signals, a plurality of remote units, each including plural antennas for communicating with communicators along plural wireless communications networks, a received communications splitter for splitting previously combined received communications signals from the base unit and supplying them to the plural antennas, a transmit communications combiner for combining transmit communications signals from the plural antennas into a combined radio frequency output, a fiberoptic transmitter receiving the combined radio frequency output and providing a corresponding optical output, and a fiberoptic receiver receiving an optical input and providing an RF output to the received communications splitter containing previously received transmit communications signals, a first optical fiber connecting each fiberoptic transmitter of the base unit with a corresponding fiberoptic receiver in a corresponding remote unit, and a second optical fiber connecting each fiberoptic transmitter of a remote unit with a corresponding fiberoptic receiver in the base unit.

8 Claims, 9 Drawing Sheets

COMMUNICATIONS SYSTEM

FIELD OF THE INVENTION

The present invention relates to communications systems generally and more particularly to wireless communications systems employing optical fibers.

BACKGROUND OF THE INVENTION

Cellular radio was conceived to provide high capacity mobile communications without requiring large amounts of spectrum. The original concept as proposed by AT&T, involves the use of a frequency band within a region known as a cell and reusing the same frequency band in other adjacent cells with manageable interference between cells.

The capacity of a cellular radio network increases as the number of cells increases with decreasing cell size. The small cells are known as microcells. Optical fibers have been used to feed the RF signal to microcells. Optical fiber can be run inside buildings, train stations, malls, etc. to improve coverage in a wireless communications system.

U.S. Pat. No. 5,457,357 describes a number of details of a fiber optic microcellular radio system.

Present day wireless communications systems may be divided into a number of groups. These include cellular telephone networks, cordless telephones, wide area data networks, wireless local area networks, paging/messaging and satellite mobile systems. Each wireless communications system has its own frequency band and modulation scheme as well as its own geographic location in which the system is deployed. Some of these systems may become obsolete while others may evolve into future personal communication systems. Nevertheless, it appears that two or more wireless systems will commonly be found in any location.

Conventionally, each wireless communications system has its own network for improved coverage in buildings and other shadowed areas. A building which requires improved coverage for more than one wireless service must be "wired" separately for each service.

SUMMARY OF THE INVENTION

The present invention seeks to provide an improved distributed antenna network for microcells. The present invention further seeks to provide a single optical fiber network which is used simultaneously for a number of wireless communications systems.

There is thus provided in accordance with a preferred embodiment of the present invention a wireless communications station comprising:
  a base unit including:
    a communications interface for communicating with plural wireless communications networks;
    a received communications combiner for combining received communications signals received from the plural wireless communications networks into a single radio frequency output;
    a transmit communications splitter for splitting previously combined transmit communications signals to be transmitted to the plural wireless communications networks into plural radio frequency outputs;
    at least one fiberoptic transmitter receiving the single radio frequency output and providing a corresponding optical output; and
    at least one fiberoptic receiver receiving an optical input and providing an RF output containing previously combined transmit communications signals;
  a plurality of remote units, each including:
    plural antennas for communicating with communicators along plural wireless communications networks;
    a received communications splitter for splitting previously combined received communications signals from the base unit and supplying them to the plural antennas;
    a transmit communications combiner for combining transmit communications signals from the plural antennas into a combined radio frequency output;
    a fiberoptic transmitter receiving the combined radio frequency output and providing a corresponding optical output; and
    a fiberoptic receiver receiving an optical input and providing an RF output to the received communications splitter containing previously received transmit communications signals;
  a first optical fiber connecting each fiberoptic transmitter of the base unit with a corresponding fiberoptic receiver in a corresponding remote unit; and
  a second optical fiber connecting each fiberoptic transmitter of a remote unit with a corresponding fiberoptic receiver in the base unit.

Preferably each remote unit also comprises a diplexer or other isolation apparatus interposed between each of the plural antennas and the combiner and the splitter, so as to enable simultaneous two way communications via each antenna at different frequencies for transmission and reception.

Preferably the plural wireless communications networks include at least two communications networks selected from the group consisting of cellular telephone networks, cordless telephones, wide area data networks, wireless local area networks, personal communications systems, personal communications networks, paging/messaging networks and satellite mobile systems.

In accordance with a preferred embodiment of the present invention, a low frequency control signal is multiplexed by the communications interface onto the fiber network for providing loop back alarm status of each remote unit and to provide control signals thereto, which control amplifier gain thereof.

In accordance with a preferred embodiment of the present invention, the plural antennas include at last one swivel mounted directional antenna whose direction may be adjusted on site.

Preferably, the base unit also includes tuning circuitry which permits dynamic tuning and transmission/reception balance of cell size of each of the remote units.

The base unit may also include a network management interface which allows monitoring of the operational status of a base unit and the remote units connected thereto.

Preferably, the fiberoptic transmitter employs a vertical cavity surface emitting laser or an edge emitting laser coupled to a single or multi mode fiber. The edge emitting laser may be a distributed feedback laser integrated with an optical isolator.

There is additionally provided in accordance with a preferred embodiment of the present invention a microcellular telecommunications system employing a fiber network including optical fibers which may be single or multi mode and optical transmitters for transmitting signals along the optical fibers, the optical transmitters comprising a vertical cavity surface emitting laser.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
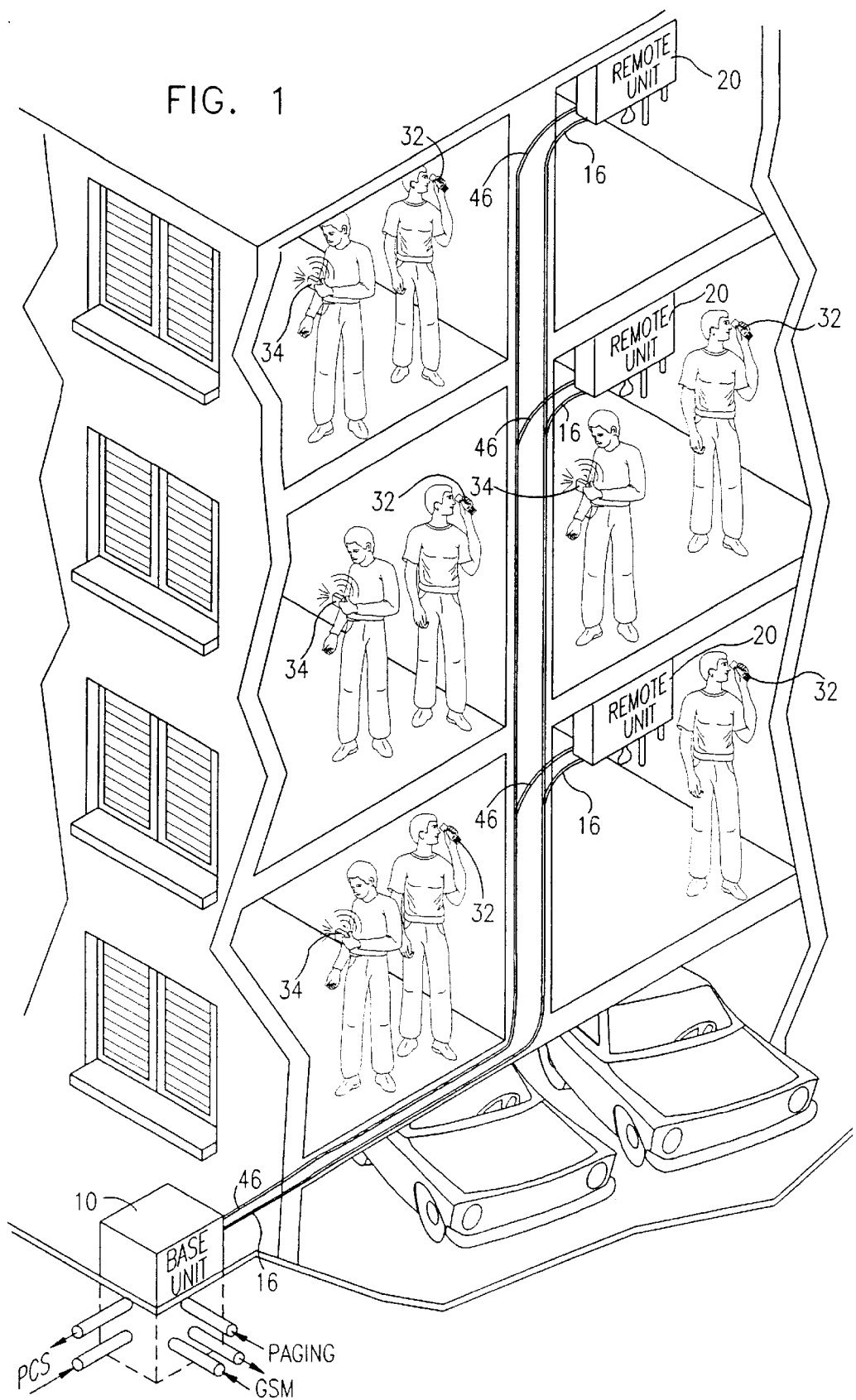
FIG. 1 is a simplified pictorial illustration of part of a wireless communications station, constructed and operative in accordance with a preferred embodiment of the present invention.
Figure 2:
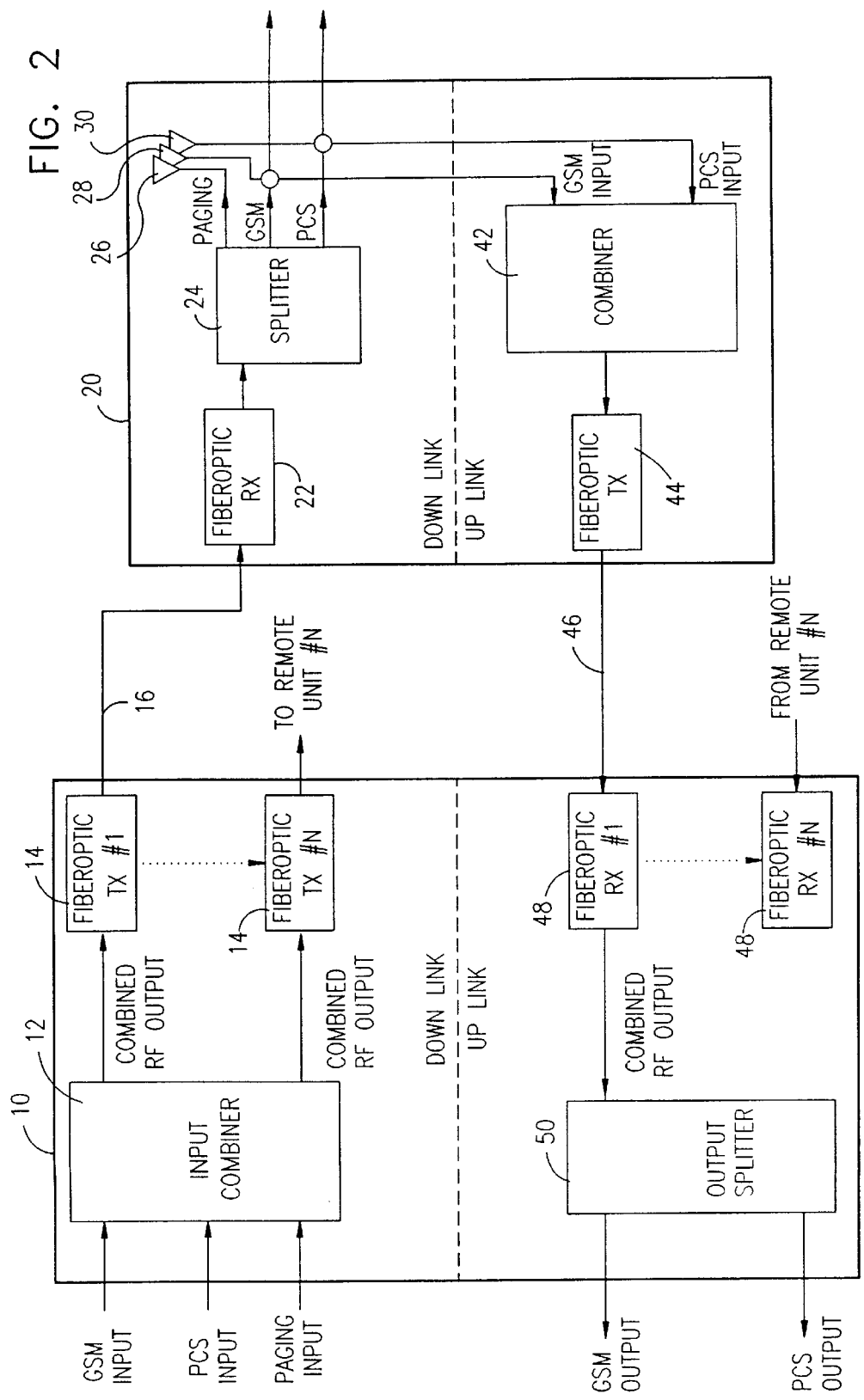
FIG. 2 is a simplified block diagram illustration of circuitry employed in the apparatus of FIG. 1.

Reference is now made to FIGS. 1 and 2, which illustrate a multi-system station which forms part of a wireless communications system constructed and operative in accordance with a preferred embodiment of the present invention.

In a typical system a plurality of wireless network services, such as PCS, GSM and other wireless telephone and radio services as well as paging services, each communicate via an appropriate antenna (not shown) with one or more multi-system stations such as that illustrated in FIG. 1. Each station may be a building, part of a building or a plurality of buildings, depending upon system requirements.

In accordance with a preferred embodiment of the present invention, each station comprises a base unit 10 which communicates with each of the required wireless network services, typically via wide bandwidth RF interface wired links which provide, typically a GSM input, a GSM output, a PCS input, a PCS output and a paging input. It is appreciated that any other suitable systems may also be connected to the base unit 10.

As seen in FIG. 2, the base unit 10 preferably comprises an input combiner 12, which combines the various wireless inputs, such as the GSM, PCS and paging inputs into a combined output, typically in the form of a multiplexed signal, and provides the multiplexed signal via respective fiberoptic transmitters 14 and fiberoptic cables 16 to a plurality of remote units 20, which are typically distributed on different floors, or even in different rooms of one or more buildings or any indoor or shadowed areas, depending on the building construction and system requirements.

Each remote unit 20 typically comprises a fiberoptic receiver 22 which receives the combined output, which is typically an RF output, and supplies it to a splitter 24 which is connected to individual antennas, such as antennas 30, 28 and 26 for PCS, GSM and paging networks respectively. Each of antennas 26, 28 and 30 preferably has at least one external antenna connection. The splitter divides the combined output into individual output signals, such as, for example, PCS, GSM and paging signals which are sent to respective antennas 30, 28 and 26.

Antennas 26, 28 and 30 transmit signals received via combiner 12, transmitters 14, optical fibers 16, receivers 22, and splitters 24 to subscriber units such as cellular telephones 32 and pagers 34 (FIG. 1).

In each remote unit 20, antennas 26, 28 and 30 preferably operate in a full duplex mode and also receive signals from subscriber units such as cellular telephones 32 operating on one or more networks, such as, for example, GSM and PCS networks. These signals are supplied to a combiner 42 which combines the various wireless signal inputs, such as the GSM and PCS signals, into a combined output, typically in the form of a multiplexed signal, and provides the multiplexed signal via a fiberoptic transmitter 44 and a fiberoptic cable 46 to base unit 10. Base unit 10 typically comprises a plurality of fiberoptic receivers 48, each corresponding to one of remote units 20, which receive the combined signal over fiberoptic cable 46 and supply it to an output splitter 50, which splits the combined signal into a plurality of individual signal outputs, such as, for example, a GSM output and a PCS output.

Figure 3:
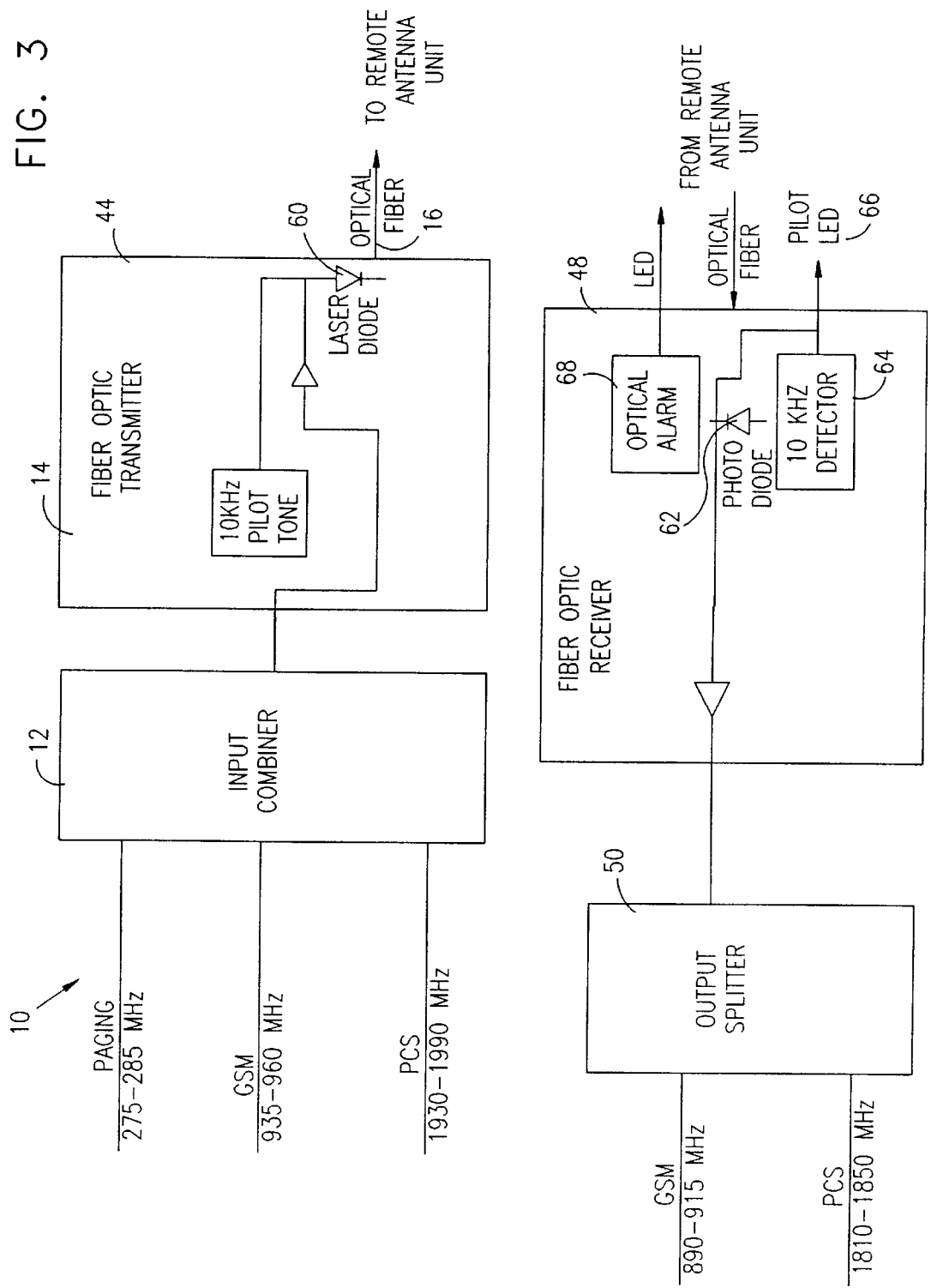
FIG. 3 is a somewhat more detailed block diagram illustration of part of the circuitry of FIG. 2.

Reference is now made to FIG. 3 which illustrates the circuitry of the base unit 10 in somewhat more detail, showing typical input signal levels and frequency bands of the various input signals to the base unit. It is seen that the fiber optics transmitter typically comprises a laser diode 60. Preferably the transmitter 14 employs a vertical cavity surface emitting laser or an edge emitting laser coupled to a single or multi-mode fiber 16.

Preferably each fiberoptic receiver 48 comprises a photodiode 62 which converts the optical signal to RF. A 10 KHz detector 64 detects and filters out a 10 KHz tone. If the 10 KHz tone is not detected, this is an indication of a break in the communications link and detector 64 causes illumination of a pilot LED 66. Another indication of a break in the communications link is the absence of received light, which may be indicated by an optical alarm 68.

Figure 4:
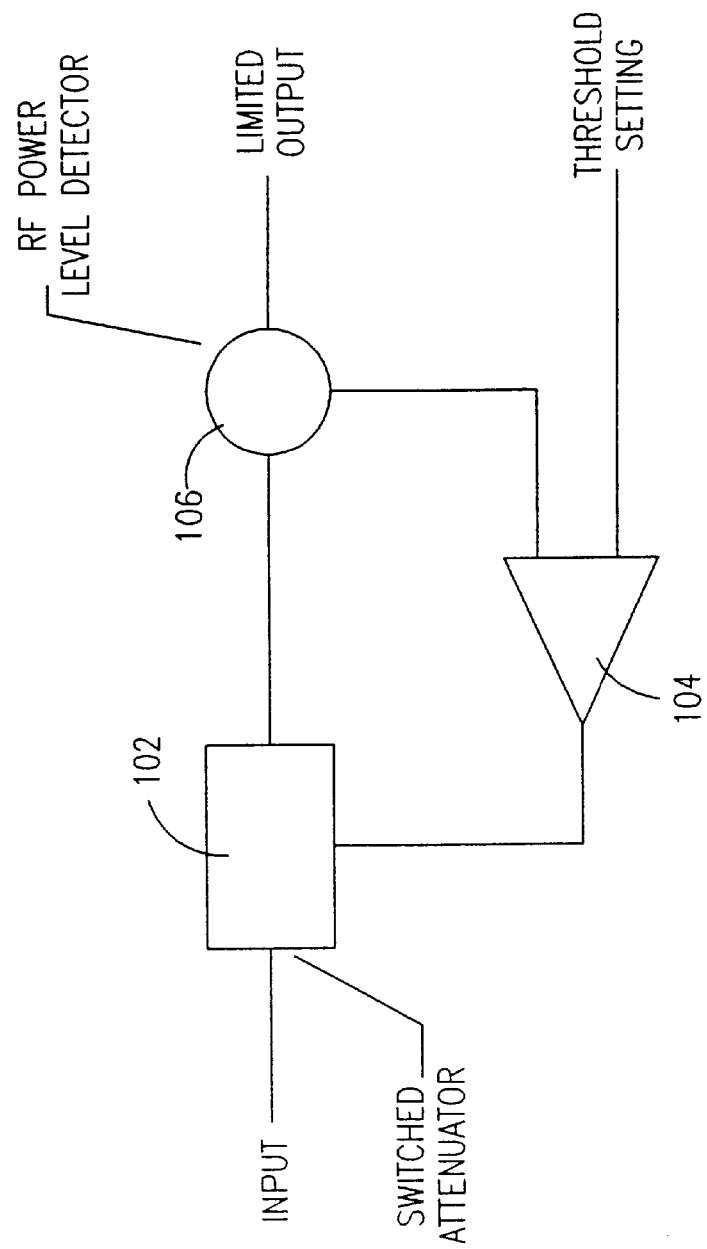
FIG. 4 is a simplified block diagram illustration of a soft limiter, constructed and operative in accordance with a preferred embodiment of the present invention.

Reference is now made to FIG. 4 which illustrates a soft limiter 100, constructed and operative in accordance with a preferred embodiment of the present invention. At the uplink, one or more mobile telephones situated very close to the remote antenna may overdrive laser diode 60. Soft limiter 100 may be used at the uplink to prevent laser diode 60 from being overdriven, and thereby prevent non-linear distortion in all of the services distributed. At the downlink, soft limiter 100 protects any of the wireless services from inadvertently increasing input power to base unit 10.

Soft limiter 100 preferably includes a switched attenuator 102, a comparator 104 and an RF power level detector 106, as shown in FIG. 4.

Figure 5A:
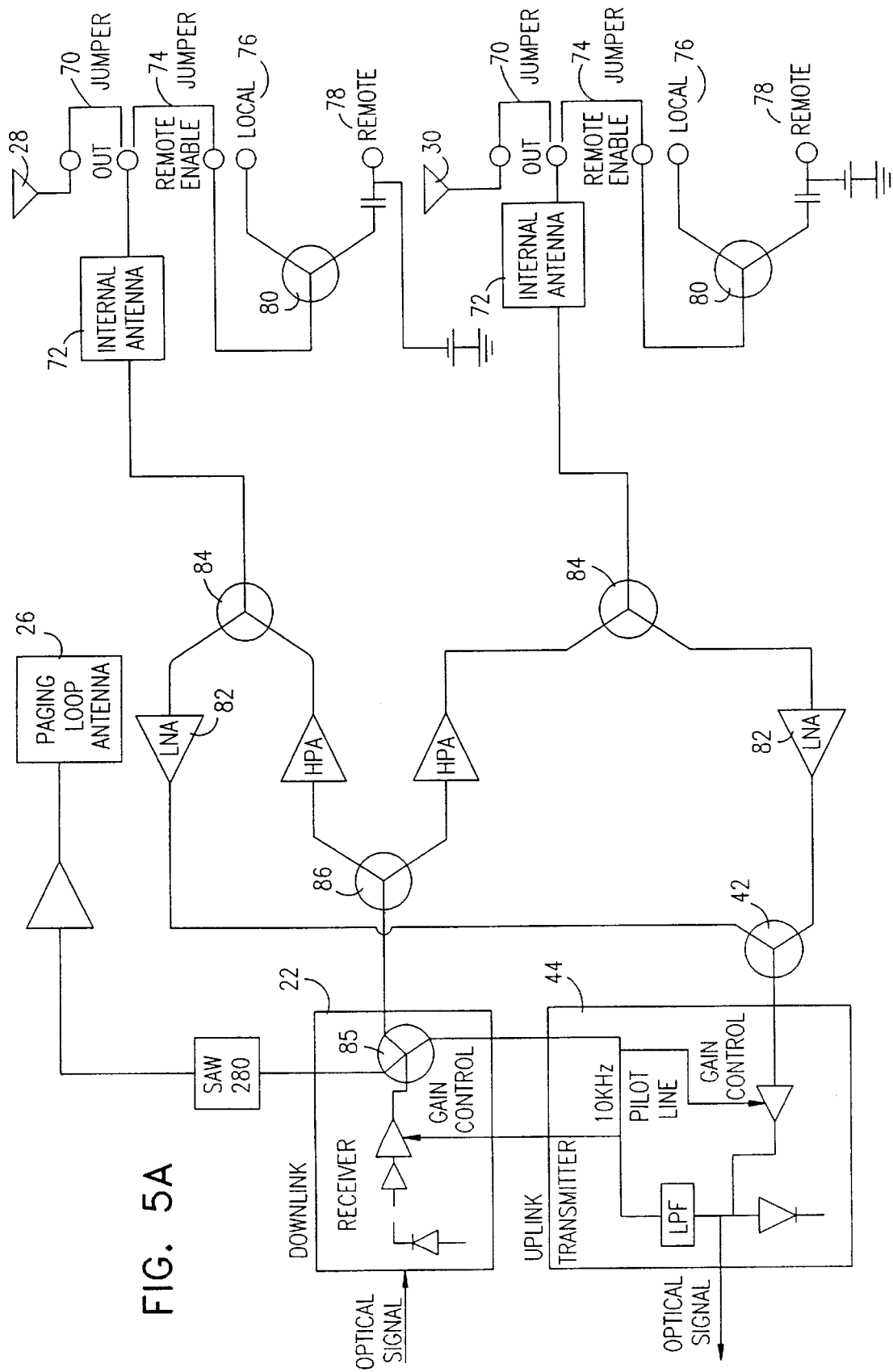
FIG. 5A is a simplified block diagram of part of the circuitry of FIG. 2, in accordance with a preferred embodiment of the present invention.

Reference is now made to FIG. 5A which is a block diagram of part of the circuitry of FIG. 2. There are a number of options of antenna communications with the communications system of the present invention. At the uplink portion of the communications system, jumpers may be used to connect the GSM antenna 28 and the PCS antenna 30 to local and/or remote antennas. Specifically, a jumper 70 may be used to connect GSM antenna 28 solely to an internal antenna 72. An additional jumper 72 may be used to connect GSM antenna 28 to a local antenna 76, which is preferably the same internal antenna 72, and to a remote antenna 78. Remote antenna 78 preferably is DC powered to allow for amplification and may be connected by coax. Local antenna 76 and remote antenna 78 are preferably connected via a power divider/combiner 80. The foregoing description applies equally for PCS antenna 30, as shown in FIG. 5A.

The signals from each GSM antenna 28 and PCS antenna 30 are each input to a low noise amplifier (LNA) 82 via an antenna duplexer 84 in order to enable the same antenna to be used for transmission and reception. The signals from both the GSM antenna 28 and PCS antenna 30 are combined by combiner 42 and input to fiberoptic transmitter 44.

At the downlink, the optical signal from base unit 10 is amplified and demultiplexed by a demultiplexer 85. Preferably three signals are demultiplexed. A 10 KHz tone is input to transmitter 44, a low frequency paging signal is input to paging loop antenna 26, and an RF signal, comprising combined GSM and PCS signals, is input to a demultiplexer 86. These signals are each input to their respective antenna via antenna duplexer 84.

As seen in FIG. 5A, a gain control is provided at receiver 22 and transmitter 44. The gain level is controlled by the amplitude of the 10 KHz pilot tone. The simultaneous gain control of the transmitted and received signals determines the size of the local cell.

Figure 5B:
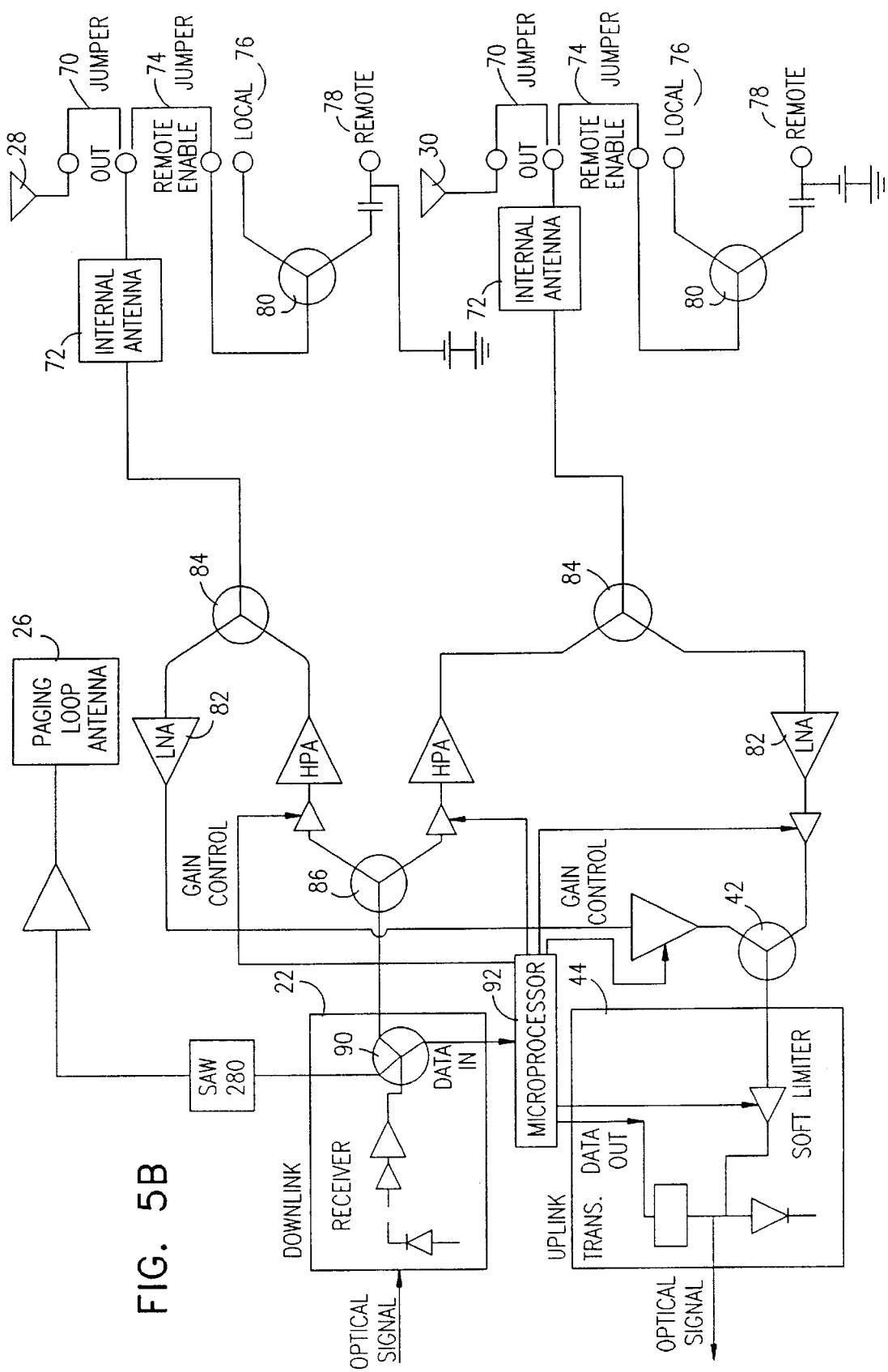
FIG. 5B is a simplified block diagram of part of the circuitry of FIG. 2, in accordance with another preferred embodiment of the present invention, and including microprocessor control of remote antenna units.

Reference is now made to FIG. 5B which illustrates microprocessor control of remote units 20. Instead of analog control using the 10 KHz tone, a low frequency data signal may be multiplexed by a multiplexer 90 along with the RF signal. A microprocessor 92 at each remote unit 20 receives the signal. The absence of the signal indicates an alarm status which microprocessor 92 relays to a microprocessor (not shown) at base unit 10. The low frequency data signal may be used for status and control of remote unit 20, and may include the following control parameters:

a. Cell size: This controls gains of the transmitted and received signals b. Balance between transmitted and received signals c. Threshold of soft limiter 100.

Figure 5C:
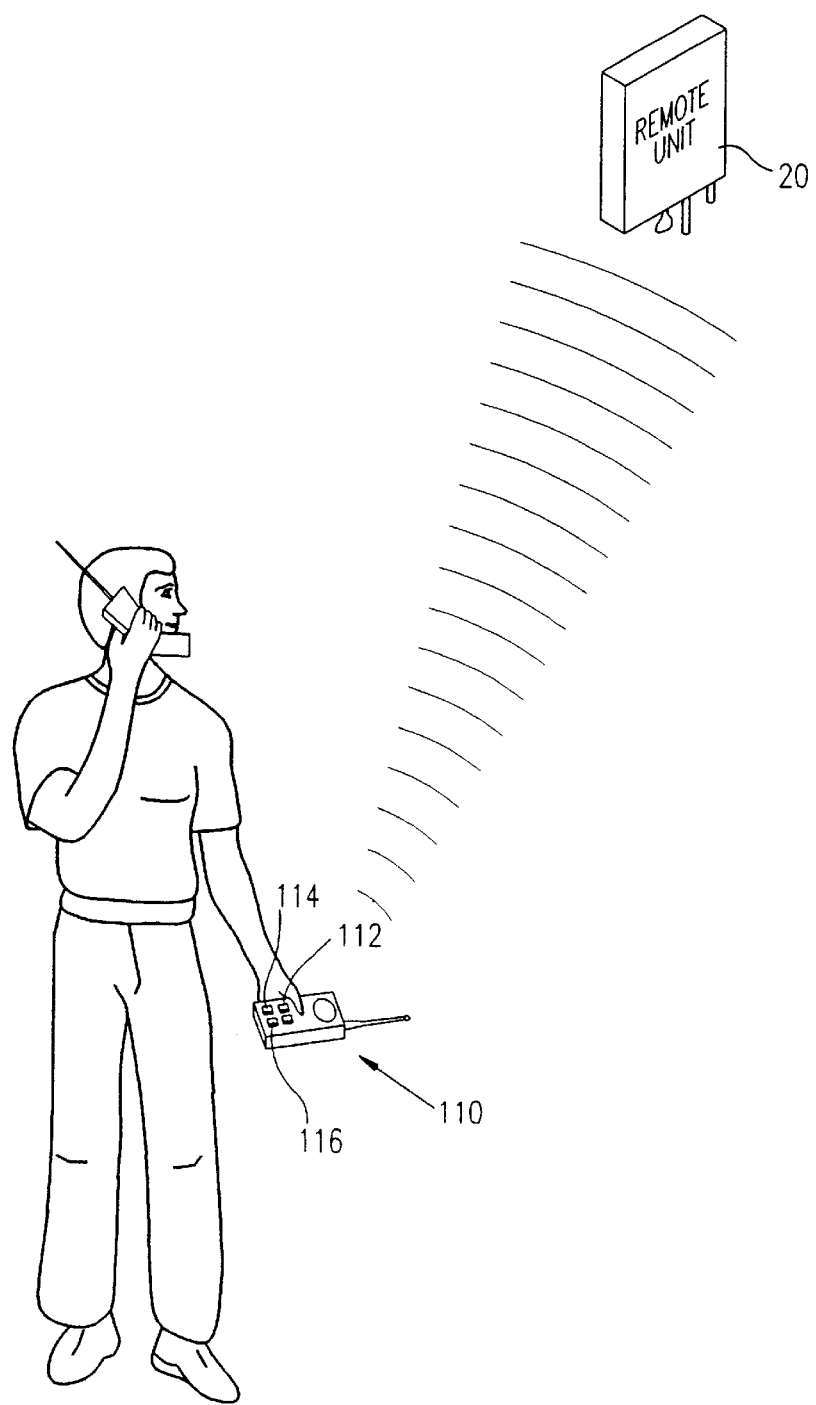
FIG. 5C is a simplified illustration of a remote control unit for remotely controlling control parameters of a local cell, in accordance with a preferred embodiment of the present invention.

Control parameters may be from base unit 10 or remotely controlled through a network management interface. However, it is sometimes more convenient to set these control parameters locally while the unit is tested in situ. Reference is now made to FIG. 5C which illustrates a remote control unit 110 for remotely controlling control parameters of a local cell, in accordance with a preferred embodiment of the present invention. Remote control unit 110 preferably includes a plurality of control buttons, such as a cell size control button 112 and a balance control button 114. For example, control button 112 may control volume, while control button 114 may control transmit cell balance, such as stereo balance. An additional control button 116 may be provided for controlling threshold of soft limiter 100.

Figure 6:
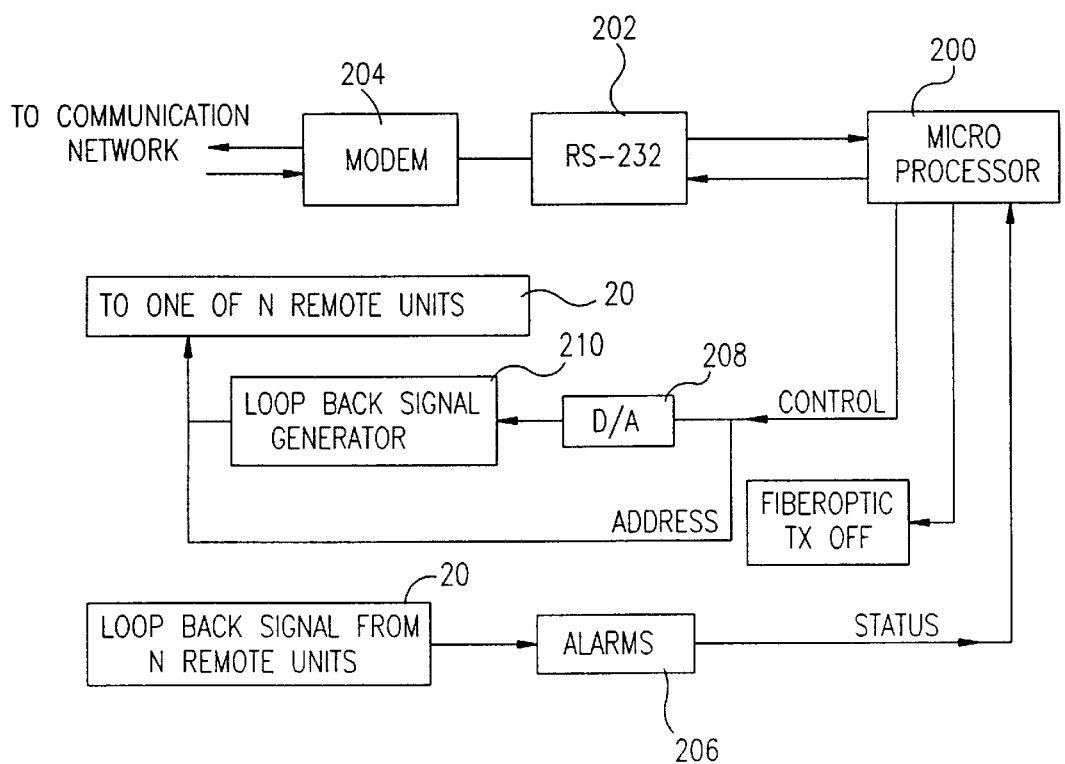
FIG. 6 is a simplified block diagram illustration of network management apparatus useful in the apparatus of FIGS. 1–5B.

Reference is now made to FIG. 6, which is a simplified block diagram illustration of network management apparatus useful in the apparatus of FIGS. 1–5C. The network management apparatus typically comprises a microprocessor 200 which communicates typically via an RS 232 interface 202 and a modem 204 with an external communications network such as an ordinary telephone network. The microprocessor receives status indications from alarm indicators 206 which indicate malfunctions in remote units 20 (FIG. 1) based on receipt of loop back signals therefrom.

Microprocessor 200 provides gain control signals to the remote units via a D/A converter 208 and a loop back signal generator 210. Loop back signal generator 210 preferably operates at approximately 10 KHz.

Figure 7:
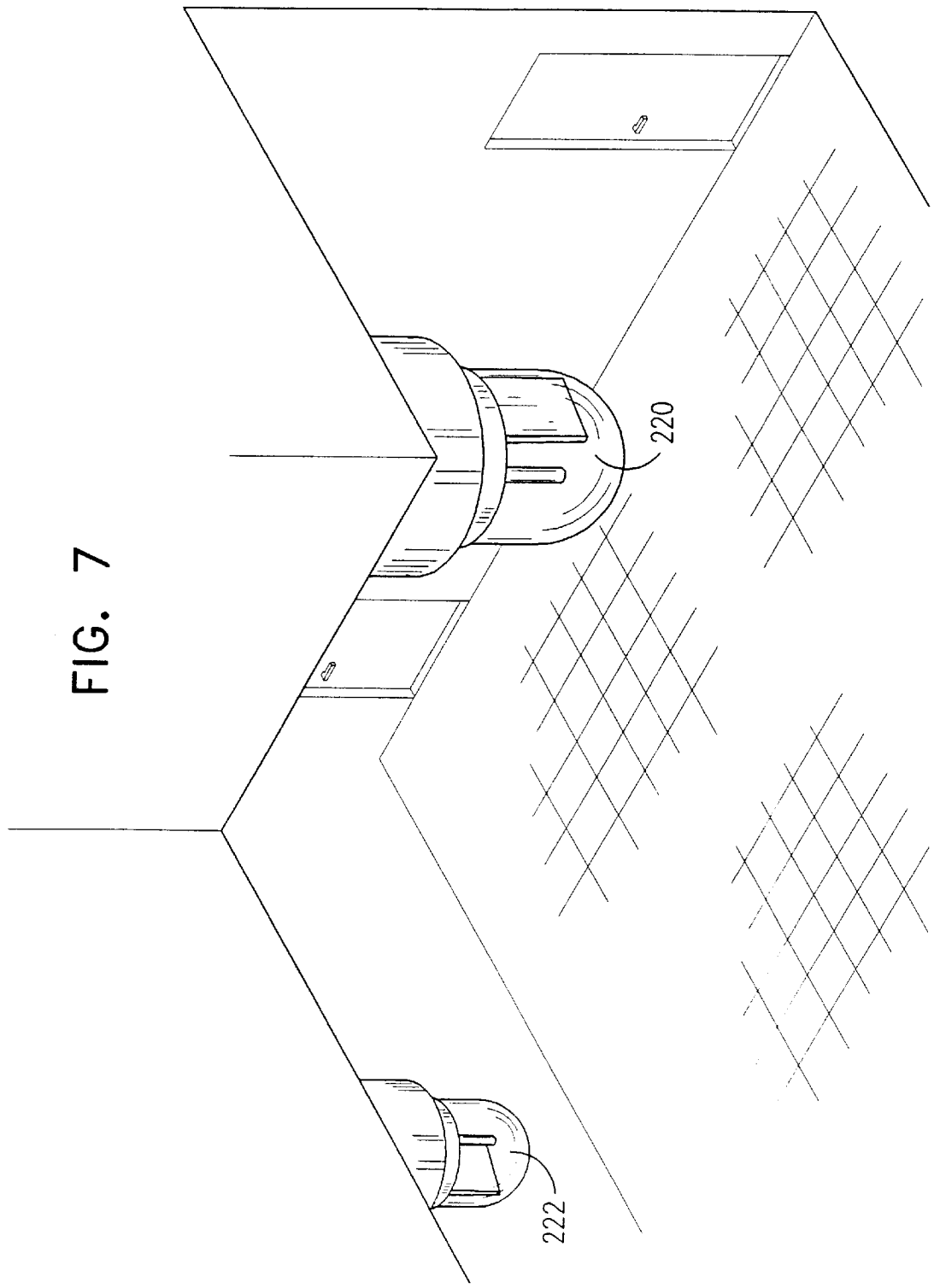
FIG. 7 is an illustration of the use of directional antennas in a system of the type illustrated in FIGS. 1–6.

Reference is now made to FIG. 7, which is an illustration of the use of directional antennas in a system of the type illustrated in FIGS. 1–6. FIG. 7 shows the use of two such antennas, indicated by reference numerals 220 and 222, which are aimed in different directions. Directionality is achieved by rotating the ground plane around the vertical antenna. Antennas 28 and 30 (FIG. 2) are preferably antennas of this type. This allows for tuning and balancing of cell size once the basic fixed installations have been made. This further allows for future tuning and balancing to overcome obstacles or partitions which may be constructed in the building in the future.

It will be appreciated by persons skilled in the art that the present invention is not limited by what has been particularly shown and described hereinabove. Rather the scope of the present invention is defined only by the claims which follow:

What is claimed is:

1. A communications station comprising:
   a base unit comprising:
      a communications interface for communicating with plural wireless communications networks;
   wherein the plural wireless communications networks comprise at least two communications networks selected from the group consisting of cellular telephone networks cordless telephones, wide area data networks wireless local area networks, personal communications systems, personal communications networks, paging/messaging networks and satellite mobile systems;
      a received communications combiner for combining received analog communications signals received from said plural wireless communications networks into a single radio frequency analog output;
   a transmit communications splitter for splitting previously combined transmit analog communications signals to be transmitted to said plural wireless communications networks into plural radio frequency analog outputs;
      at least one fiberoptic transmitter receiving said single radio frequency analog output and providing a corresponding optical output; and
      at Least one fiberoptic receiver receiving an optical input and providing an RF analog output containing previously combined transmit analog communications signals;
   a plurality of remote units, each comprising:
      plural antennas for communicating with communicators along plural wireless communications networks;
      a received communications splitter for splitting previously combined received analog communications signals from said base unit and supplying them to said plural antennas;
      a transmit communications combiner for combining transmit analog communications signals from said plural antennas into a combined radio frequency analog output;
      a fiberoptic transmitter receiving said combined radio frequency analog output and providing a corresponding optical output; and
      a fiberoptic receiver receiving an optical input and providing an RF analog output to said received communications splitter containing previously received transmit analog communications signals;
   a first optical fiber connecting each fiberoptic transmitter of said base unit with a corresponding fiberoptic receiver in a corresponding remote unit; and
   a second optical fiber connecting each fiberoptic transmitter of a remote unit with a corresponding fiberoptic receiver in said base unit; and wherein a low frequency control signal is multiplexed by said communications interface onto said optical fiber for providing loop back alarm status of each remote unit and for providing control signals thereto, which control amplifier gain and balance thereof.

2. Apparatus according to claim 1, wherein a single duplex cable interconnects each of said antennas with said communications interface.

3. A communications station comprising:
   a base unit comprising:
      a communications interface for communicating with plural wireless communications networks;
   wherein the plural wireless communications networks comprise at least two communications networks selected from the group consisting of cellular telephone networks, cordless telephones, wide area data networks, wireless local area networks, personal communications systems, personal communications networks, paging/messaging networks and satellite mobile systems;
      a received communications combiner for combining received analog communications signals received from said plural wireless communications networks into a single radio frequency analog output;
      a transmit communications splitter for splitting previously combined transmit analog communications signals to be transmitted to said plural wireless communications networks into plural radio frequency analog outputs;
      at least one fiberoptic transmitter receiving said single radio frequency analog output and providing a corresponding optical output; and
      at least one fiberoptic receiver receiving an optical input and providing an RF analog output containing previously combined transmit analog communications signals;
   a plurality of remote units each comprising:
      plural antennas for communicating with communicators along plural wireless communications networks;
      a received communications splitter for splitting previously combined received analog communications signals from said base unit and supplying them to said plural antennas;
      a transmit communications combiner for combining transmit analog communications signals from said plural antennas into a combined radio frequency analog output;
      a fiberoptic transmitter receiving said combined radio frequency analog output and providing a corresponding optical output; and
      a fiberoptic receiver receiving an optical input and providing an RF analog output to said received communications splitter containing previously received transmit analog communications signals;
   a first optical fiber connecting each fiberoptic transmitter of said base unit with a corresponding fiberoptic receiver in a corresponding remote unit; and
   a second optical fiber connecting each fiberoptic transmitter of a remote unit with a corresponding fiberoptic receiver in said base unit; and
   wherein a low frequency data signal is multiplexed by said communications interface to a microprocessor for providing loop back alarm status of each remote unit and for providing control signals thereto, which control amplifier gain and balance thereof.

4. Apparatus according to claim 3, wherein a single duplex cable interconnects each of said antennas with said communications interface.

5. A communications station comprising:
   a base unit comprising:
      a communications interface for communicating with plural wireless communications networks;
   wherein the plural wireless communications networks comprise at least two communications networks selected from the group consisting of cellular telephone networks, cordless telephones wide area data networks wireless local area networks personal communications systems, personal communications networks, paging/messaging networks and satellite mobile systems;
      a received communications combiner for combining received analog communications signals received from said plural wireless communications networks into a single radio frequency analog output;
      a transmit communications splitter for splitting previously combined transmit analog communications signals to be transmitted to said plural wireless communications networks into plural radio frequency analog outputs;
      at, least one fiberoptic transmitter receiving said single radio frequency analog output and providing a corresponding optical output; and
      at least one fiberoptic receiver receiving an optical input and providing an RF analog output containing previously combined transmit analog communications signals;
   a plurality of remote units each comprising:
      plural antennas for communicating with communicators along plural wireless communications networks;
      a received communications splitter for splitting previously combined received analog communications signals from said base unit and supplying them to said plural antennas;
      a transmit communications combiner for combining transmit analog communications signals from said plural antennas into a combined radio frequency analog output;
      a fiberoptic transmitter receiving said combined radio frequency analog output and providing a corresponding optical output; and
      a fiberoptic receiver receiving an optical input and providing an RF analog output to said received communications splitter containing previously received transmit analog communications signals;
   a first optical fiber connecting each fiberoptic transmitter of said base unit with a corresponding fiberoptic receiver in a corresponding remote unit; and
   a second optical fiber connecting each fiberoptic transmitter of a remote unit with a corresponding fiberoptic receiver in said base unit; and
   wherein said base unit also comprises tuning circuitry which permits dynamic tuning and transmission/reception balance of cell size of each of the remote units.

6. Apparatus according to claim 5, wherein a single duplex cable interconnects each of said antennas with said communications interface.

7. A communications station comprising:
   a base unit comprising:
      a communications interface for communicating with plural wireless communications networks;
   wherein the plural wireless communications networks comprise at least two communications networks selected from the group consisting of cellular telephone networks, cordless telephones, wide area data networks, wireless local area networks, personal communications systems, personal communications networks, paging/messaging networks and satellite mobile systems;

a received communications combiner for combining received analog communications signals received from said plural wireless communications networks into a single radio frequency analog output;

a transmit communications splitter for splitting previously combined transmit analog communications signals to be transmitted to said plural wireless communications networks into plural radio frequency analog outputs;

at least one fiberoptic transmitter receiving said single radio frequency analog output and providing a corresponding optical output; and at least one fiberoptic receiver receiving an optical input and providing an RF analog output containing previously combined transmit analog communications signals;

a plurality of remote units, each comprising:

plural antennas for communicating with communicators along plural wireless communications networks;

a received communications splitter for splitting previously combined received analog communications signals from said base unit and supplying them to said plural antennas;

a transmit communications combiner for combining transmit analog communications signals from said plural antennas into a combined radio frequency analog output;

a fiberoptic transmitter receiving said combined radio frequency analog output and providing a corresponding optical output; and a fiberoptic receiver receiving an optical input and providing an RF analog output to said received communications splitter containing previously received transmit analog communications signals;

a first optical fiber connecting each fiberoptic transmitter of said base unit with a corresponding fiberoptic receiver in a corresponding remote unit;

a second optical fiber connecting each fiberoptic transmitter of a remote unit with a corresponding fiberoptic receiver in said base unit; and a soft limiter for substantially preventing distortion due to an inadvertent increase in communication power.

8. Apparatus according to claim 7, wherein a single duplex cable innterconnects each of said antennas with said communications interface.

* * * * *